(12) United States Patent
Kölhi et al.

(10) Patent No.: US 10,298,984 B2
(45) Date of Patent: May 21, 2019

(54) NETWORK PVR

(71) Applicant: TELEFONAKTIEBOLAGET LM ERICSSON (PUBL), Stockholm (SE)

(72) Inventors: Johan Kölhi, Stockholm (SE); Michael Huber, Stockholm (SE); Jacob Ström, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 11 days.

(21) Appl. No.: 15/125,838

(22) PCT Filed: Mar. 17, 2014

(86) PCT No.: PCT/EP2014/055344
§ 371 (c)(1),
(2) Date: Sep. 13, 2016

(87) PCT Pub. No.: WO2015/139728
PCT Pub. Date: Sep. 24, 2015

(65) Prior Publication Data
US 2017/0006324 A1    Jan. 5, 2017

(51) Int. Cl.
*H04N 21/2662* (2011.01)
*H04N 21/2343* (2011.01)
*H04N 21/24* (2011.01)
*H04L 29/06* (2006.01)
(Continued)

(52) U.S. Cl.
CPC ....... *H04N 21/2662* (2013.01); *H04L 65/601* (2013.01); *H04L 65/80* (2013.01); *H04N 21/23439* (2013.01); *H04N 21/234327* (2013.01); *H04N 21/2402* (2013.01); *H04N 21/4147* (2013.01); *H04L 67/02* (2013.01)

(58) Field of Classification Search
CPC ..................... H04N 21/2662; H04N 21/23655
See application file for complete search history.

(56) References Cited

U.S. PATENT DOCUMENTS

2006/0265371 A1\* 11/2006 Edmond ........... G06F 17/30017
2012/0110120 A1   5/2012 Willig et al.
(Continued)

FOREIGN PATENT DOCUMENTS

WO       2006125225 A2    11/2006
WO       2012019621 A1     2/2012
WO       2013098317 A1     7/2013

OTHER PUBLICATIONS

International Search Report and Written Opinion issued in corresponding International application No. PCT/EP2014/055344, dated Nov. 6, 2014, 10 pages.
(Continued)

*Primary Examiner* — Michael H Hong
(74) *Attorney, Agent, or Firm* — Patent Portfolio Builders, PLLC

(57) ABSTRACT

There is provided a method for transmitting video content, the video content available for transmission in a plurality of quality levels. The method comprises identifying a user apparatus that has received a particular chunk of video content at a first quality level. The method further comprises transmitting to the identified user apparatus the filename for a chunk of video content corresponding to the particular chunk but at a second quality level.

12 Claims, 3 Drawing Sheets

(51) Int. Cl.
*H04N 21/4147* (2011.01)
*H04L 29/08* (2006.01)

(56) References Cited

U.S. PATENT DOCUMENTS

| | | | | |
|---|---|---|---|---|
| 2013/0042015 | A1* | 2/2013 | Begen | H04N 19/46 709/231 |
| 2013/0243395 | A1* | 9/2013 | Kummer | H04N 5/782 386/291 |
| 2014/0379871 | A1* | 12/2014 | Van Brandenburg | H04L 65/4084 709/219 |
| 2015/0288732 | A1* | 10/2015 | Phillips | H04L 65/60 709/219 |
| 2015/0358373 | A1* | 12/2015 | Famaey | H04N 21/26258 709/231 |
| 2017/0171287 | A1* | 6/2017 | Famaey | H04L 67/02 |

OTHER PUBLICATIONS

Sodagar, Iraj, "The MPEG-DASH Standard for Multimedia Streaming Over the Internet," Industry and Standards, IEE Computer Society, ISSN: 1070-986X, SP002717752, dated Apr. 1, 2011, pp. 62-67.

\* cited by examiner

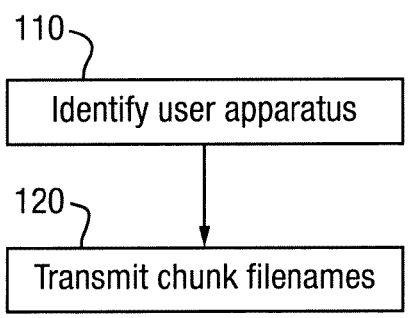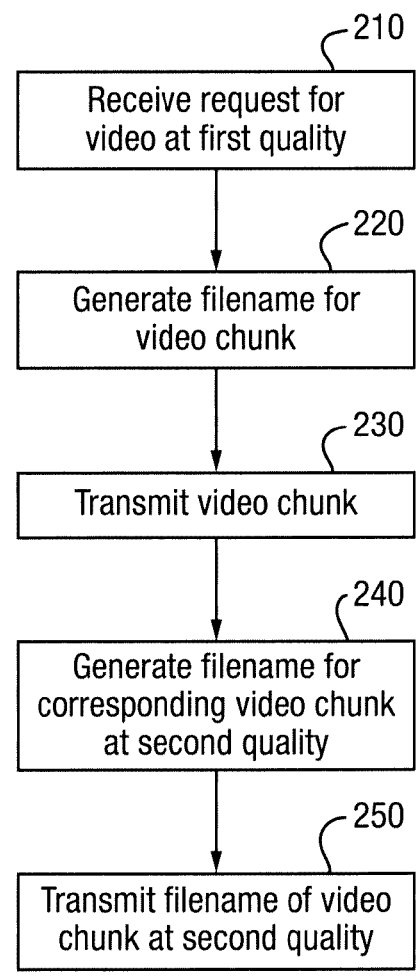

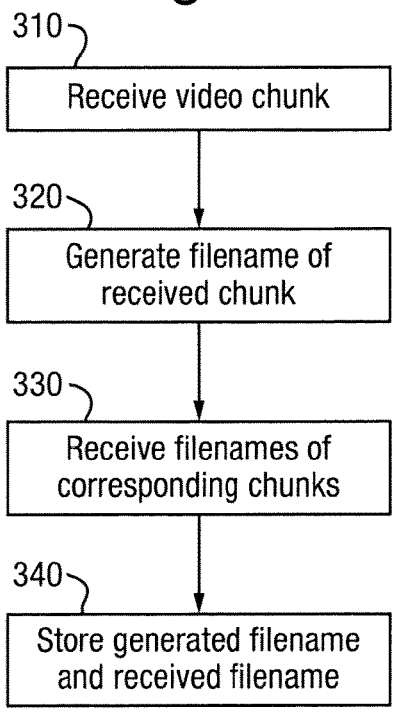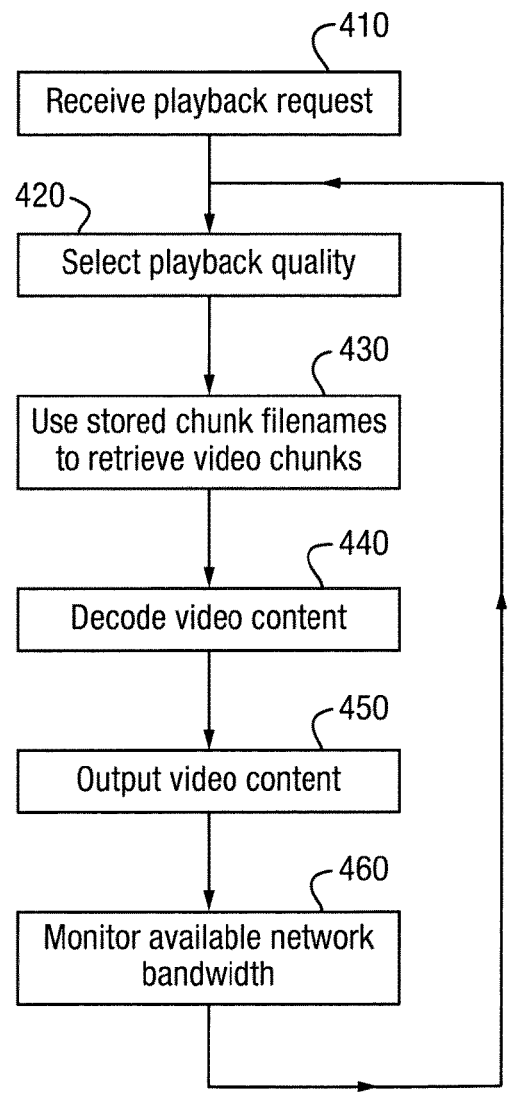

NETWORK PVR

CROSS REFERENCE TO RELATED APPLICATION(S)

This application is a 35 U.S.C. § 371 National Phase Entry Application from PCT/EP2014/055344, filed Mar. 17, 2014, designating the United States, the disclosure of which is incorporated by reference.

TECHNICAL FIELD

The present application relates to a method for transmitting video content, a method for recording video content in a user apparatus, a transmission apparatus, a user apparatus, an apparatus for transmitting video content, and a computer-readable medium.

BACKGROUND

Adaptive Bitrate Streaming (ABS) is a technique used in streaming multimedia over computer networks which is becoming increasingly popular for the delivery of video services. Current adaptive streaming technologies are almost exclusively based upon HTTP and are designed to operate over large distributed HTTP networks such as the internet. Adaptive HTTP streaming (AHS) supports both video on demand and live video, enabling the delivery of a wide range of video services to users.

Most of the adaptive HTTP streaming techniques require a client to continuously fetch media segments from a server. A certain amount of media time (e.g. 10 sec of media data) is contained in a typical media segment. The server provides a manifest file to the client, which manifest file specifies the Uniform Resource Locators (URLs) that the client should request in order to play back the streamed video. Each manifest item identifies a segment of the video. A single video stream may consist of several manifest files, each identifying segments corresponding to a portion of the stream.

There are two main approaches to storing video segments on the server. In a first approach, the entire video is stored in a single file. Each segment has a specific URL and a server side Application Programming Interface (API) is used to map segment URLs into file ranges or byte ranges. In a second approach, the video is stored in multiple files called chunks, with each chunk usually corresponding to a single segment. The manifest file contains the URLs of the individual chunks. An advantage of this second approach is that the client video player uses normal HTTP requests to request the chunks, as each chunk is an individual file. This approach is therefore well supported by existing HTTP architecture.

Client video players may display live or on demand video content immediately, fetching and displaying the video segments as the manifest files are made available. Alternatively, broadcast streamed content may be recorded by a client video player and stored for later display. In this case, the client video player stores the video chunks from the broadcast manifest files, enabling the video chunks to be viewed at a later date. Client storage may be located in the client home, for example in the form of a set top box and hard drive. A new generation of Network Personal Video Recorders (N-PVRs) offers an alternative storage solution, in which a service provider maintains a large number of servers on which a subscriber's media content may be stored. Each individual subscriber is thus offered a private storage area on the network servers.

Network based digital storage offers advantages to the client but places a large demand on the network. This demand may include significant duplication of stored video files; the same digital content may be stored multiple times on the network servers if many subscribers choose to record the same video streams, corresponding to popular films or programs for example. Useful economies of storage could in theory be made through the implementation of shared network storage, in which the same digital content could be accessed by several users.

Despite the potential advantages of shared network storage, there are considerable difficulties with managing client access to shared contents. For licensing and perhaps other legal reasons, it is important that the network PVR is functionally identical to a local PVR. This means that only users who have programmed their personal video recorders to record a particular video stream should be able to access that stream from the shared storage for later viewing. Stored chunk filenames are provided in the manifest files at the time of broadcast and these can be locally stored by the PVR. However, chunk filenames can be guessed, meaning that a personal video recorder which was not programmed to record a video stream may still access the stored video chunks of the stream from the shared storage by guessing the chunk filenames. This is highly undesirable, as users should only be able to access content that they have recorded at the time of broadcast.

A solution to this problem is described in the applicant's patent application PCT/EP2014/052057, whereby chunk filenames are not transmitted to the PVR, but instead are derived from the live stream of video content, possibly by a cryptographic hash.

A problem with that solution is that where content is available at multiple quality levels, a PVR can only access the quality level it initially received. This means that if the PVR recorded the filenames during a period of heavy network traffic, when it would have received the lower quality version of the video content, then played back the file at a later time with much lower network traffic, the PVR would not be able to access the higher quality version of the video content because it would not know the filenames for the appropriate chunks. Similarly, if the PVR recorded the chunk filenames during a period of low network traffic, it could receive the high quality version of the video content and record those filenames. Then, if the video is played back during a time of high network traffic, there may not be sufficient bandwidth available to stream the high quality video chunks, in which case playback will fail.

SUMMARY

Accordingly, there is provided a method for transmitting video content, the video content available for transmission in a plurality of quality levels. The method comprises identifying a user apparatus that has received a particular chunk of video content at a first quality level. The method further comprises transmitting to the identified user apparatus the filename for a chunk of video content corresponding to the particular chunk but at a second quality level.

This method results in multiple qualities of video content being available for all recorded content, so adaptive bitrate streaming can take place also for recorded content when it is played back later and bandwidth is varying.

The filenames of a plurality of chunks of video content corresponding to the particular chunk but at other quality levels may be transmitted to the identified user apparatus. It is common in adaptive bit rate streaming that a plurality of quality levels are available. These quality levels may be low, medium and high.

The method may further comprise identifying a particular chunk of video content to be transmitted, the particular chunk having a first quality level. The method may go onto generate a filename for the particular chunk of video content to be transmitted and transmit the particular chunk of video content to a user apparatus. A filename of a chunk of video content corresponding to the particular chunk but in a second quality level may be generated. The filename of a chunk of video content may be derived from the chunk of video content.

The method may further comprise receiving a record request from a user apparatus. In response to the request to record particular content received from a user apparatus, a determination is made that the user apparatus has received a particular chunk of video content at the first quality level.

There is further provided a method for recording video content in a user apparatus. The method comprises receiving a particular chunk of video content in a first quality level, and generating a filename for the received chunk of video content, the filename derived from the received chunk of video content. The method further comprises receiving the filename of a chunk of video content corresponding to the particular chunk but in a second quality level. The method further still comprises storing the generated filename and the received filename in a user specific storage.

By deriving the chunk filename from the received chunk of video content, the user apparatus is able to locate the video chunk on a server for later retrieval. An intelligent network is able to identify which user apparatuses have received the video content at any quality level, and then send the filenames for chunks at the non-received video qualities. This results in multiple qualities of video content being available for all recorded content, so adaptive bitrate streaming can take place also for recorded content when it is played back later and bandwidth is varying.

The filenames of a plurality of chunks of video content corresponding to the particular chunk but at other quality levels may be received by the user apparatus. It is common in adaptive bit rate streaming that a plurality of quality levels are available. These quality levels may be low, medium and high.

The method may further comprise outputting video content decoded from a plurality of chunks of video content. The chunks of video content may contain encoded video content, in which case the video chunks are decoded to obtain the video content. The video content may be output to a display as it is received.

The method may further comprise receiving a playback request for the video content, and in response thereto outputting video content decoded from a plurality of chunks of video content. A playback request may be received some time after the video chunks were first received. In response to such a request the stored filenames of the video chunks are used to retrieve the required video chunks from the network.

The quality level of the video content to be output may be selected dependent on the network bandwidth available. While outputting the video content, a different quality level may be selected dependent on a change in the network bandwidth available. Filenames are stored for a plurality of quality levels; in response to a playback request, and/or during playback, a quality level is selected dependent upon the network bandwidth available and the chunks corresponding to the selected quality level are retrieved from the network.

The video chunks at different quality levels may be encoded at different bitrates. Having video content available for streaming at different bitrates means that the video quality can be adapted to the network bandwidth available.

The filename for a chunk of video content may be generated by performing a cryptographic hash function on data associated with the chunk of video content, and setting the output hash value of the cryptographic hash function as the chunk filename. Using a cryptographic hash function ensures that a user apparatus that has not received it cannot guess the filename of a video chunk. The filename may be derived from the encoded video data in the video chunk, or from metadata associated with the video chunk, or a combination of both.

There is further provided a transmission apparatus for transmitting video content, the video content available for transmission in a plurality of quality levels. The transmission apparatus comprises a server for transmitting chunks of video content. The transmission apparatus further comprises a network information node arranged to identify a user apparatus that has received a particular chunk of video content at a first quality level.

The transmission apparatus further comprises the server arranged to transmitting to the identified user apparatus the filename for a chunk of video content corresponding to the particular chunk but at a second quality level.

There is further provided a user apparatus for recording video content. The user apparatus comprises a receiver arranged to receive a particular chunk of video content in a first quality level. The user apparatus comprises a processor arranged to generate a filename for the received chunk of video content, the filename derived from the received chunk of video content. The user apparatus further comprises the receiver further arranged to receive the filename of a chunk of video content corresponding to the particular chunk but in a second quality level. The user apparatus further still comprises user specific storage arranged to store the generated filename and the received filename.

There is further provided an apparatus for transmitting video content, the video content available for transmission in a plurality of quality levels. The apparatus comprises a processor and a memory, said memory containing instructions executable by said processor. The apparatus is operative to: identify a user apparatus that has received a particular chunk of video content at a first quality level; and transmit to the identified user apparatus the filename for a chunk of video content corresponding to the particular chunk but at a second quality level.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided a user apparatus comprising a processor and memory, said memory containing instructions executable by said processor whereby said user terminal is operative to: receive a particular chunk of video content in a first quality level; generate a filename for the received chunk of video content, the filename derived from the received chunk of video content; receive the filename of a chunk of video content corresponding to the particular chunk but in a second quality level; and store the generated filename and the received filename in a user specific storage.

BRIEF DESCRIPTION OF THE DRAWINGS

An improved network PVR will now be described, by way of example only, with reference to the accompanying drawings, in which:

FIG. 1 illustrates a method for transmitting video content;

FIG. 2 illustrates an alternative method for transmitting video content;

FIG. 3 illustrates a method for recording video content in a user apparatus;

FIG. 4 illustrates a method for playing recorded video content in a user apparatus;

DETAILED DESCRIPTION

Figure 5:
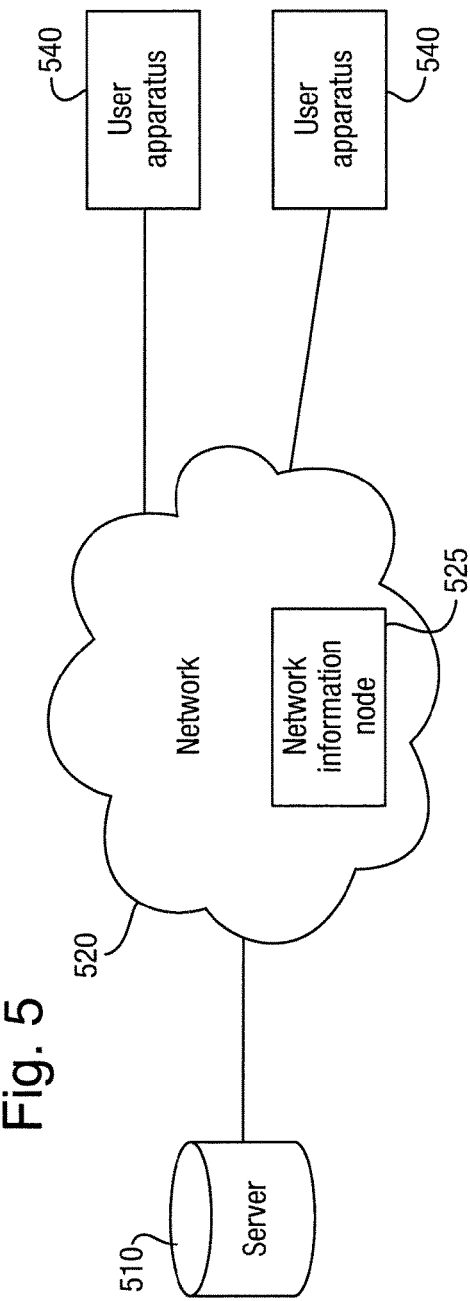
FIG. 5 illustrates a transmission apparatus for transmitting video content.

The solution defied herein uses an intelligent network infrastructure to monitor network traffic. When a PVR records a program, the server uses a network management protocol such as IGMPv3 to identify which PVRs are receiving a stream of video content. Internet Group Management Protocol (IGMP) is an example of a network management protocol that is used by hosts and adjacent routers on IP networks to establish multicast group memberships. IGMP can be used for one-to-many networking applications such as online streaming video and gaming, and allows more efficient use of resources when supporting these types of applications.

This information makes it possible for the server to send the additional chunk names for all video chunks in other quality levels to PVRs that are entitled to receive them. This is done without comprising the security of the system by preventing a PVR from accessing video chunks it is not entitled to.

So a PVR recording a channel on low bitrate and generating chunk names locally, will receive the additional chunk names for medium and high definition video at the same time from the network and/or head end. When the end-user wishes to playback the video content, he/she can watch the TV-show with the most appropriate quality. Further, the selected quality can be changed during playback should the available network bandwidth change, for example.

FIG. 1 illustrates a method for transmitting video content. The video content is available for transmission in a plurality of quality levels. The method comprises identifying a user apparatus that has received a particular chunk of video content at a first quality level. The method further comprises transmitting to the identified user apparatus the filename for a chunk of video content corresponding to the particular chunk but at a second quality level.

This method results in multiple qualities of video content being available for all recorded content, so adaptive bitrate streaming can take place also for recorded content when it is played back later and bandwidth is varying.

By using a protocol such as IGMPv3, the streaming head-end knows which user apparatuses are receiving a video content stream. The head-end may then also send to a positively identified user apparatus the chunk filenames for chunks at other quality levels. In this way, a user apparatus can record content at one quality and then play it back at another. This is particularly useful where the network traffic conditions may change significantly between the time when video content is first streamed and the time when it is played back by the user apparatus.

Typically, the video content will be available in a plurality of quality levels and as such the filenames of the chunks of video content corresponding to the particular chunk but at all the other available quality levels may be transmitted to the identified user apparatus.

FIG. 2 illustrates an alternative method for transmitting video content. The method comprises receiving 210 a request from a user apparatus, the request is for a particular chunk of video content at a first quality level. At 220 a filename is generated for the particular chunk of video content to be transmitted and then the particular chunk of video content is transmitted 230 to the user apparatus. At 240 the filename of a chunk of video content corresponding to the particular chunk but in a second quality level is generated. At 250 this generated filename is transmitted to the user apparatus.

If the video content being sent to the PVR is for immediate output on a display, then the server does not need to transmit 250 the filenames for the chunks at other video qualities. Therefore, the server may be arranged to only do this in response to receiving a record request from the user apparatus. Then, in response to the request to record particular content received from a user apparatus, a determination is made that the user apparatus has received a particular chunk of video content at the first quality level, before the additional filenames are sent to it.

The filename for the chunk of video content is derived from the chunk. Deriving the filename from the chunk of video means that the filename does not need to be sent to a user apparatus. The user apparatus can derive the filename of a received chunk from the received stream of chunks. Using the chunk filename, a user apparatus can retrieve the chunk from a server. This may be done at a later time, after the initial streaming transmission, or broadcast of the video content. However, only a user apparatus that received the initial broadcast stream can retrieve past chunks in this way. This means that once the received stream has been processed, the user apparatus need only store the chunk filenames, as opposed to the chunks themselves, in order to allow the later playback of the video content. Storing a filename requires far less storage than storing a video chunk, and accordingly, the user apparatus in such a system requires far less data storage volume.

FIG. 3 illustrates a method for recording video content in a user apparatus. The method begins when a particular chunk of video content in a first quality level is received 310. This chunk may be received as part of a multicast stream. A multicast transmission is sometimes called a broadcast.

A filename for the received chunk of video content is generated 320. The filename is derived from the received chunk of video content. This may be the encoded video data or merely metadata associated with the video content. Subsequently, the filename of a chunk of video content corresponding to the particular chunk but in a second quality level is received 330 by the user apparatus. The user apparatus then stores 340 both the generated filename and the received filename in local storage.

By deriving the chunk filename from the received chunk of video content, the user apparatus is able to locate the video chunk on a server for later retrieval. Importantly, only a user apparatus that has received the original chunk can generate the filename to achieve this. An intelligent network is able to identify which user apparatuses received a particular multicast transmission. As such the network can inform the server which user apparatuses have received particular video content and at which quality level. The server can use this information to send the filenames for chunks at the non-received video quality levels. This results in multiple qualities of video content being available for all recorded content in the network PVR system, so adaptive bitrate streaming can take place also for recorded content when it is played back later and bandwidth is varying.

It is possible that in certain embodiments a server will not be able to identify which quality level a user apparatus has accessed, merely that the user apparatus was using adaptive bitrate streaming to access particular video content. In such an embodiment the server will send the filenames for all video chunks to a user apparatus that is identified as having received the corresponding stream. For practical reasons this may also be implemented even where a server is able to identify which quality level a user apparatus has accessed.

FIG. 4 illustrates a method for playing recorded video content in a user apparatus. The user apparatus receives 410 a playback request from a user, the playback request identifying which recorded video content should be output; the content having been previously recorded on the network.

The quality level of the video content to be output is selected 420 by the user apparatus. This selection is most likely dependent on the network bandwidth available, but the maximum screen resolution of a connected display or the processing power available for decoding video content may also be taken into account.

Once a quality level is selected the chunks corresponding to the selected quality level are retrieved 430 from the network using the previously stored filenames for these chunks.

Filenames are stored for a plurality of quality levels and so playback at any of these qualities is possible. The received video chunks typical contain encoded video content. These are decoded 440 by the user apparatus and the video content is output 450 to a display. The chunks of video content may contain encoded video content, in which case the video chunks are decoded to obtain the video content.

The appropriate quality level for streaming the recorded video content is monitored 460, so that the system can adapt to changes, most likely a change in the available network bandwidth.

A playback request may be received some time after the video chunks were first received, and their filenames recorded. In response to such a request the stored filenames of the video chunks are used to retrieve the required video chunks from the network. Alternatively, a user may wish to watch a program that is being recorded as it is being received. Similarly, a user may decide to record a program as they are watching it. In these cases, the video content is output to a display as it is received, and further the names of the video chunks that carried the video content are stored at the client device.

The filename for a chunk of video content may be generated by performing a cryptographic hash function on data associated with the chunk of video content, and setting the output hash value of the cryptographic hash function as the chunk filename. Using a cryptographic hash function ensures that a user apparatus that has not received it cannot guess the filename of a video chunk. The filename may be derived from the encoded video data in the video chunk, or from metadata associated with the video chunk, or a combination of both.

The data associated with the chunk of video content may in some examples be the video content itself. Thus the video content forms the input to the cryptographic hash function, and the result of that hash function is set as the file name for the chunk. In another example, the data associated with the chunk of video content may only be a part of the content. Thus instead of using the whole video segment forming the chunk as the input to the hash function, only a part of the video segment may be used as the hash function input. In another example of the invention, the input to the hash function may be metadata associated with the chunk of video content. For example a dedicated file name descriptor may be included in the content's metadata to be used as the hash function input.

The hash function used to generate the chunk filename from the associated data may be any suitable cryptographic hash function. An example of a suitable cryptographic hash function is the SHA-256 hash function. In other examples of the invention, the hash function used may be a naming algorithm of an Information Centric Network such as the Network of Information (NetInf). In this manner, the video chunk may become a Named Data Object (NDO) within an ICN network. Use of ICN networks in connection with naming of video content chunks is discussed in further detail below.

In one example, the shared network storage may comprise a region of a network server. In other examples, the shared network storage may comprise an ICN network, such as a NetInf network. In such examples, storing the received chunk of video content in the shared storage comprises publishing the video chunk to the ICN network. In such examples, the hash function used in generating a filename for the chunk at step 320 would comprise the naming algorithm for the particular ICN network.

Information Centric Networks are based around Named Data Objects (NDOs). In contrast to historic, host centric networking, in which network architectures are based upon physical storage locations, ICN network architectures focus on delivery of specific content, and make extensive use of caching to achieve more efficient and reliable distribution of content.

An advantage of using an ICN network as network storage is that Information Centric Networks offer support for distributed shared storage. Thus, the shared network storage may comprise not just storage at network servers, but storage available at any node in the ICN network including for example set top boxes, network disk storage and central long tail servers. In one example, a network server and several individual user hard drives may all be connected to an ICN network. A user recording a broadcast video stream in accordance with the methods described herein may generate filenames for the video chunks using the naming algorithm of the ICN network, may store the filenames in their user specific storage (which may be local or may be at the network server) and may publish the video content chunks to the ICN network. The video content chunks thus become NDOs within the network. When the user wishes to watch the recoded stream at a later time, the user's recorder retrieves the filenames from the user specific storage and retrieves the video chunks from the ICN network to enable normal video playback. The nature of Information Centric Networks means the physical storage location of the video chunks could be anywhere within the ICN network. The recorder thus retrieves the chunks from the most convenient location where they are stored, which could be the network server or could be a hard drive at another user location or any other node within the ICN network holding the NDOs. ICN networks also support the simultaneous use of multiple sources, further increasing efficiency.

Also, it should be noted that IGMP is used on IPv4 networks. Multicast management on IPv6 networks is handled by Multicast Listener Discovery (MLD) which uses ICMPv6 messaging in contrast to IGMP's bare IP encapsulation.

FIG. 5 illustrates a transmission apparatus for transmitting video content, the video content available for transmission in a plurality of quality levels. The transmission apparatus comprises a server 510 for transmitting chunks of video content. Server 510 includes data storage, at least one processor, and at least one connection to a network 520. The server 510 may for example be a part of a broadcasting node, network storage or user N-PVR.

Network 520 is typically an IP network, and may be the internet or a private network. The transmission apparatus is arranged to deliver chunks of video content from the server 510 to at least one client, in the form of user apparatus 540. The chunks of video content are available from the server 510 at different quality levels; the client device 540 selects a quality level to receive and the server 510 sends that quality level to the client 540.

The transmission apparatus further comprises a network information node 525. This is arranged to identify a user apparatus 540 that has received a particular chunk of video content at a first quality level. The server 510 is arranged to transmit to the identified user apparatus 540 the filename for a chunk of video content corresponding to the particular chunk but at a second quality level.

Figure 6:
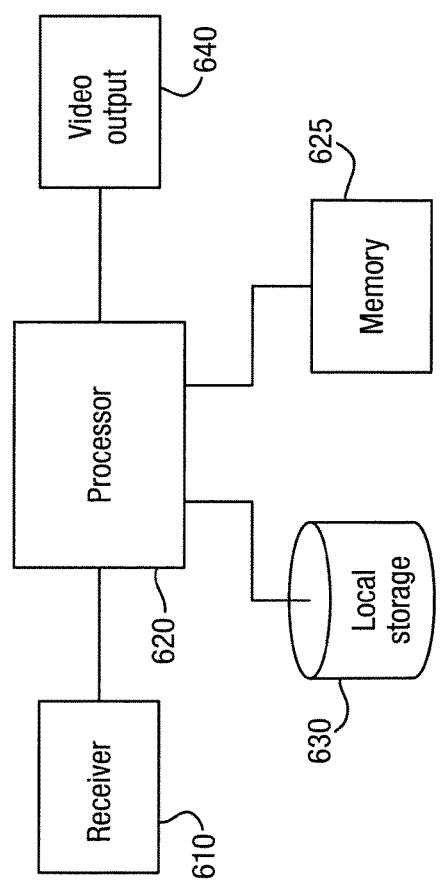
FIG. 6 illustrates a user apparatus for recording video content.

FIG. 6 illustrates a user apparatus for recording video content. The user apparatus comprises a receiver 610, a processor 620, a memory 625, local data storage 630, and a video output 640. The processor 620 is arranged to receive instructions which, when executed, causes the processor 620 to carry out the above described method. The instructions may be stored on the memory 625.

The receiver 610 is arranged to receive a particular chunk of video content in a first quality level. The processor 620 is arranged to generate a filename for the received chunk of video content, the filename derived from the received chunk of video content. The receiver 610 also receives the filename of a chunk of video content corresponding to the particular chunk but in a second quality level. The generated filename and the received filename are stored in local data storage 630.

The server may comprise an apparatus for transmitting video content, the video content available for transmission in a plurality of quality levels. The apparatus comprises a processor and a memory, said memory containing instructions executable by said processor. The apparatus is operative to: identify a user apparatus that has received a particular chunk of video content at a first quality level; and transmit to the identified user apparatus the filename for a chunk of video content corresponding to the particular chunk but at a second quality level.

The methods described herein may be embodied in a computer-readable medium, carrying instructions, which, when executed by computer logic, causes said computer logic to carry out any of the methods defined herein.

The methods described herein may be embodied in a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

The user apparatus may comprise a processor and memory, said memory containing instructions executable by said processor whereby said user apparatus is operative to: receive a particular chunk of video content in a first quality level; generate a filename for the received chunk of video content, the filename derived from the received chunk of video content; receive the filename of a chunk of video content corresponding to the particular chunk but in a second quality level; and store the generated filename and the received filename in a user specific storage.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The client device may be a user apparatus. The client device may be any kind of personal computer such as a television, a smart television, a set-top box, a games-console, a home-theatre personal computer, a tablet, a smartphone, a laptop, or even a desktop PC.

The examples of adaptive streaming described herein, are not intended to limit the streaming system to which the disclosed method and apparatus may be applied. The principles disclosed herein can be applied to any streaming system which uses different video qualities, such as HTTP Adaptive Streaming, Apple™ HTTP Live Streaming, and Microsoft™ Smooth Streaming.

In one embodiment, the adaptive bitrate streaming is modified to encompass the above described system by providing a super-low quality version of video content. The super-low quality version is not intended for viewing but is made available to recording devices such as PVRs. This means that recording a show could be done using the super-low quality stream just to get access to all video chunk names for that show. This could save a lot of bandwidth in the network when popular programs are being recorded.

Further, while examples have been given in the context of a particular communications network, these examples are not intended to be the limit of the communications networks to which the disclosed method and apparatus may be applied. The principles disclosed herein can be applied to any communications network which carries media using streaming, including both wired IP networks and wireless communications networks such as LTE and 3G networks.

The invention claimed is:

1. A method for transmitting video content, the video content being available for transmission in a plurality of quality levels, the method comprising:

receiving a record request transmitted by a user apparatus, the record request identifying particular video content and indicating that, for each chunk of the particular video content received by the user apparatus, the user apparatus will, after receiving the chunk of the particular video content, record an object identifier identifying the received chunk of the video content;

generating a first object identifier identifying a first chunk of video data that comprises a first portion of the particular video content encoded at a first quality level;

identifying that the user apparatus has requested the first chunk of video data; and as a consequence of receiving the record request transmitted by the user apparatus and after identifying that the user apparatus has requested the first chunk of video data, transmitting to the user apparatus a second object identifier for retrieving a second chunk of video data, the second chunk of video data comprising said first portion of the particular video content encoded at a second quality level that is different than the first quality level.

2. The method of claim 1, further comprising:

transmitting to the user apparatus a third object identifier for retrieving a third chunk of video data, the third chunk of video data comprising said first portion of the particular video content encoded at a third quality level; and transmitting to the user apparatus a fourth object identifier for retrieving a fourth chunk of video data, the fourth chunk of video data comprising said first portion of the particular video content encoded at a fourth quality level.

3. The method of claim 1, further comprising:

identifying a third chunk of video data to be transmitted, the third chunk of video data comprising a second portion of the particular video content encoded at the first quality level;

generating a third object identifier for retrieving the third chunk of video data to be transmitted;

transmitting the third chunk of video data so that the third chunk can be received by the user apparatus;

generating a fourth object identifier for retrieving a fourth chunk of video data, the fourth chunk of video data comprising the second portion of the particular video content encoded at the second quality level that is different than the first quality level; and after transmitting to the user apparatus the second object identifier, transmitting to the user apparatus the fourth object identifier.

4. The method of claim 1, wherein the second object identifier identifying the second chunk of video data is derived from the second chunk of video data.

5. The method of claim 1, wherein the first and second chunks of video data encoded at the first and second quality levels are encoded at different bitrates.

6. The method of claim 1, further comprising:

generating the second object identifier, wherein generating the second object identifier comprises:

performing a cryptographic hash function on data associated with the second chunk of video data to produce an output hash value; and setting the second object identifier as the output hash value of the cryptographic hash function.

7. The method of claim 1, wherein identifying that the user apparatus has requested the first chunk of video data consists of receiving from the user apparatus a request for the first chunk of video data.

8. The method of claim 1, wherein identifying that the user apparatus has requested the first chunk of video data consists of determining that the user apparatus has joined a particular multicast group.

9. A transmission apparatus for transmitting video content, the video content being available for transmission in a plurality of quality levels, the transmission apparatus being configured to:

receive a record request transmitted by a user apparatus, the record request identifying particular video content and indicating that, for each chunk of the particular video content received by the user apparatus, the user apparatus will, after receiving the chunk of the particular video content, record an object identifier identifying the received chunk of the video content;

generate a first object identifier identifying a first chunk of video data that comprises a first portion of the particular video content encoded at a first quality level;

identify that the user apparatus has requested the first chunk of video data; and as a consequence of receiving the record request transmitted by the user apparatus and after identifying that the user apparatus has requested the first chunk of video data, transmit to the user apparatus a second object identifier for retrieving a second chunk of video data, the second chunk of video data comprising said first portion of the particular video content encoded at a second quality level that is different than the first quality level.

10. An apparatus for transmitting video content, the video content being available for transmission in a plurality of quality levels, the apparatus comprising a processor and a memory, said memory containing instructions executable by said processor whereby said apparatus is operative to:

receive a record request transmitted by a user apparatus, the record request identifying particular video content and indicating that, for each chunk of the particular video content received by the user apparatus, the user apparatus will, after receiving the chunk of the particular video content, record an object identifier identifying the received chunk of the video content;

generate a first object identifier identifying a first chunk of video data that comprises a first portion of the particular video content encoded at a first quality level;

identify that the user apparatus has requested the first chunk of video data; and as a consequence of receiving the record request transmitted by the user apparatus and after identifying that the user apparatus has requested the first chunk of video data, transmit to the user apparatus a second object identifier for retrieving a second chunk of video data, the second chunk of video data comprising said first portion of the particular video content encoded at a second quality level that is different than the first quality level.

11. A method for transmitting video content, the video content being available for transmission in a plurality of quality levels, the method comprising:

determining that a network video recorder (NVR) is recording a video content stream corresponding to the video content encoded at a first quality level by performing a process comprising determining that the NVR has joined a particular multicast group associated with the video content; and after determining that the NVR is recording the video content stream corresponding to the video content encoded at the first quality level, transmitting to the NVR a set of one or more object identifiers, each of the one or more object identifiers for retrieving a chunk of video data corresponding to a portion of the video content encoded at a second quality level that is different than the first quality level.

12. The method of claim 11, wherein determining whether the NVR is recording the video content stream further comprises determining whether the NVR has issued a record message.

\* \* \* \* \*